US006772852B2

(12) United States Patent
Morin et al.

(10) Patent No.: US 6,772,852 B2
(45) Date of Patent: Aug. 10, 2004

(54) LONG TRACK MOUNTAIN SNOWMOBILE AND A TRACK THEREFOR

(75) Inventors: Denis Morin, Valcourt (CA); Chris Ruske, Lakewood, CO (US); Mark B. Thompson, Providence, UT (US)

(73) Assignee: Bombardier Recreational Products Inc., St-Bruno (CA)

( * ) Notice: Subject to any disclaimer, the term of this patent is extended or adjusted under 35 U.S.C. 154(b) by 0 days.

(21) Appl. No.: 10/259,314

(22) Filed: Sep. 30, 2002

(65) Prior Publication Data

US 2003/0047368 A1 Mar. 13, 2003

Related U.S. Application Data

(62) Division of application No. 09/701,045, filed as application No. PCT/US00/03401 on Feb. 11, 2000, now Pat. No. 6,510,913.
(60) Provisional application No. 60/181,562, filed on Feb. 10, 2000.

(51) Int. Cl.$^7$ .............................................. B62M 29/00
(52) U.S. Cl. ...................................................... 180/182
(58) Field of Search .......................... 180/182; 305/168, 305/178–180, 35, 38, 35 EB

(56) References Cited

U.S. PATENT DOCUMENTS

| | | |
|---|---|---|
| 2,786,725 A | 3/1957 | Thorne |
| 3,680,926 A | 8/1972 | Trapp |
| 3,692,132 A | 9/1972 | Pollanen |
| 3,704,918 A | 12/1972 | Perreault |
| 3,758,170 A | 9/1973 | Mazurek |
| 3,762,779 A | 10/1973 | Russ |
| 3,781,067 A | 12/1973 | Dodson et al. |

(List continued on next page.)

FOREIGN PATENT DOCUMENTS

| | | |
|---|---|---|
| JP | 09221090 A | 8/1997 |
| JP | 2000043781 A | 2/2000 |
| JP | 2000203470 A | 7/2000 |
| JP | 2001213365 A | 8/2001 |

OTHER PUBLICATIONS

1997 Ski–doo™ Bombardier, http//www.skidoo.com/Ski-Doo2003/web/jsp/100.

(List continued on next page.)

*Primary Examiner*—Lesley D. Morris
*Assistant Examiner*—Paul Royal, Jr.
(74) *Attorney, Agent, or Firm*—BRP Legal Services; Jonathan D. Cutler

(57) ABSTRACT

A novel mountain snowmobile comprises a frame, an engine disposed on the frame, at least one ski disposed on the frame, a seat disposed on the frame, a steering device disposed on the frame forward of the seat that is operatively connected to the at least one ski for steering the snowmobile, and a novel long length drive track disposed below the frame and connected operatively to the engine for propulsion of the snowmobile. The novel drive track comprises an endless body having a ground-engaging outer surface with a central portion flanked by first and second lateral portions, a plurality of longitudinally spaced reinforcing rods disposed in the body along a transverse direction of the body. The rods define a plurality of pitches, and a plurality of profiles project from the outer surface of the body along the plurality of pitches. A plurality of non-profile regions is defined along the plurality of pitches, and the profiles and profile-free regions define a pattern for each pitch. The pitch pattern for the novel track has a six pitch tread pattern which repeats every successive sixsomes of pitches. A height profile that varies between the first and second lateral portions is defined by the profiles. Such height profile has each profile with a height of not less than about 1¼ inches. The long length track has a length greater than about 141 inches.

24 Claims, 12 Drawing Sheets

U.S. PATENT DOCUMENTS

| | | | |
|---|---|---|---|
| 3,790,231 A | 2/1974 | Rose | |
| 3,840,083 A | 10/1974 | Woods | |
| 3,858,948 A | 1/1975 | Johnson et al. | |
| 3,930,689 A | 1/1976 | Maki | |
| 4,244,436 A | 1/1981 | Condon et al. | |
| 4,351,380 A | 9/1982 | Pilliod et al. | |
| 4,474,414 A | 10/1984 | Tokue | |
| 4,573,746 A | 3/1986 | Prinoth | |
| 4,991,911 A | 2/1991 | Blais | |
| 5,474,146 A | 12/1995 | Yoshioka et al. | |
| D386,721 S | 11/1997 | Bedard | |
| 5,709,440 A | 1/1998 | Lecours | |
| 5,713,645 A | 2/1998 | Thompson et al. | |
| 5,722,745 A | 3/1998 | Courtemanche et al. | |
| 5,730,510 A | 3/1998 | Courtemanche et al. | |
| 5,791,429 A | 8/1998 | Bergman | |
| 6,109,217 A | 8/2000 | Hedlund et al. | |
| 6,109,705 A | 8/2000 | Courtemanche | |
| D436,892 S | 1/2001 | Soucy et al. | |
| 6,263,991 B1 | 7/2001 | Savage et al. | |
| 6,510,913 B1 * | 1/2003 | Morin et al. | 180/182 |
| 6,609,771 B2 * | 8/2003 | Morin et al. | 305/178 |

OTHER PUBLICATIONS

1997 Skandic™ Bombardier, http//www.skidoo.com/Ski-Doo2003/web/jsp/100.

1997 SWT, Bombardier, http//www.skidoo.com/Ski-Doo2003/web/jsp/100.

Bombardier's Manual 2000; Snowmobile Line–up Description and Specification Brochure (avaiable at least as of Jan. 2000).

* cited by examiner

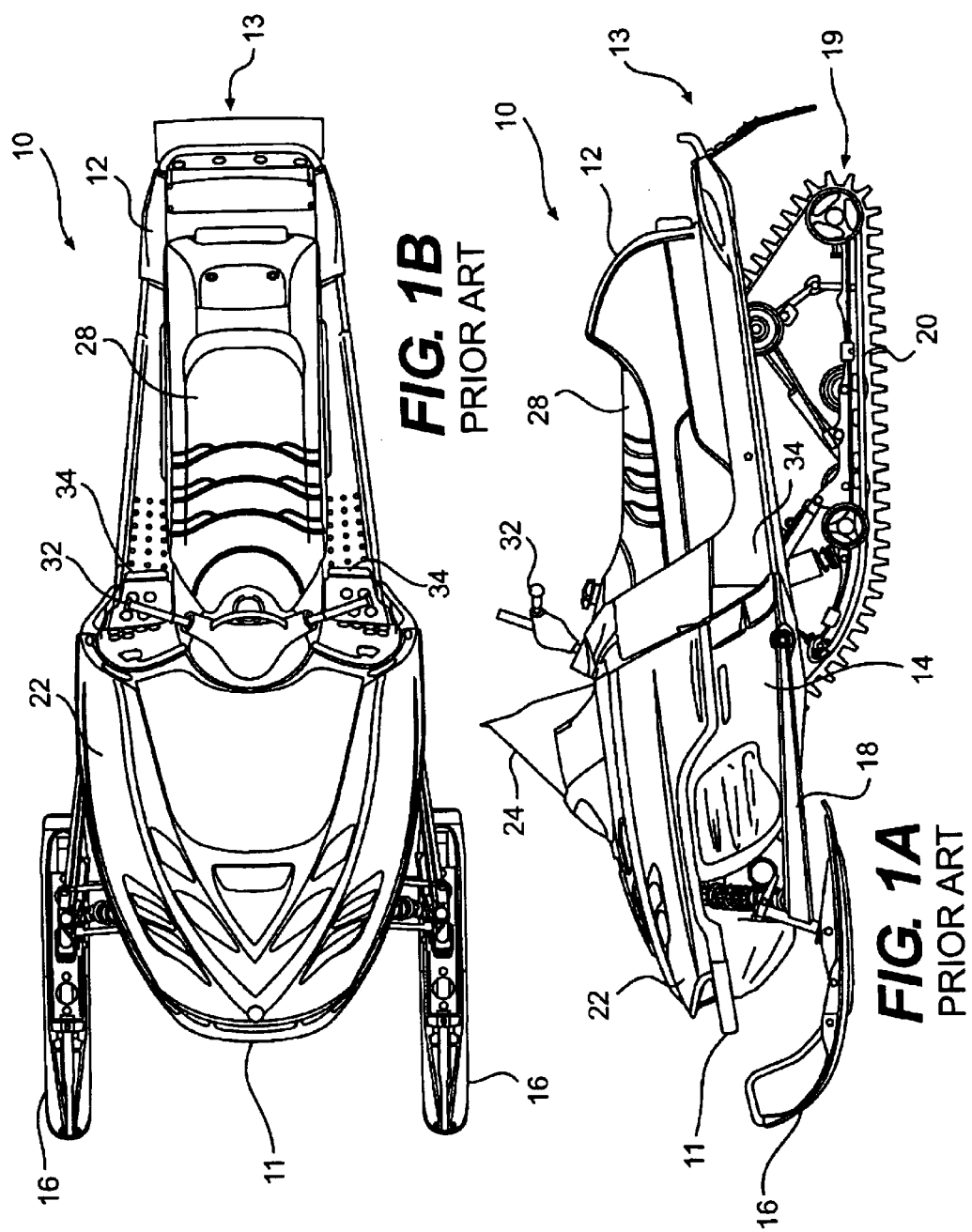

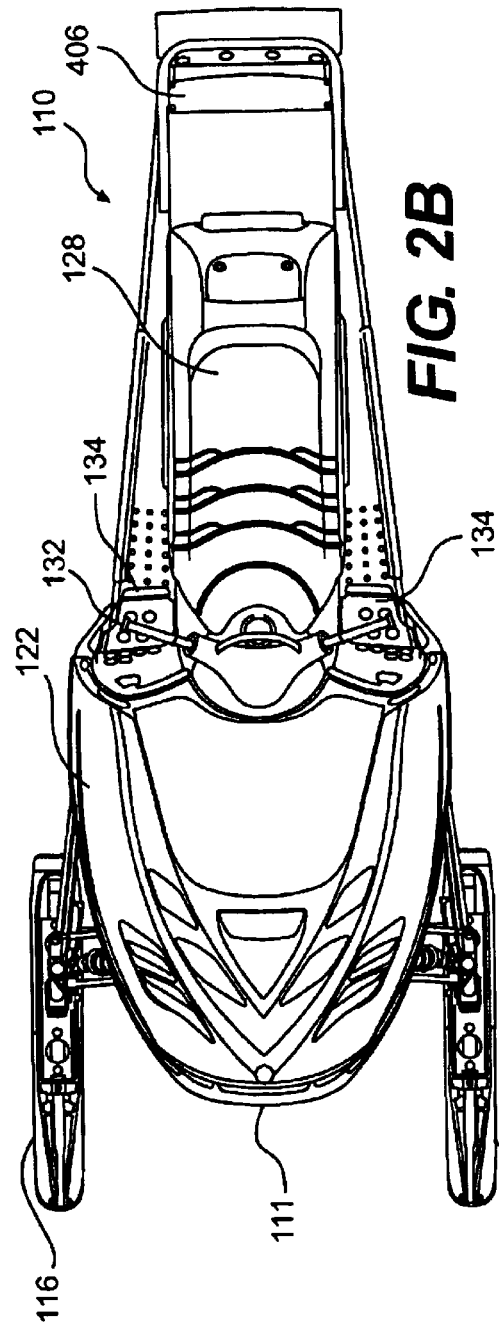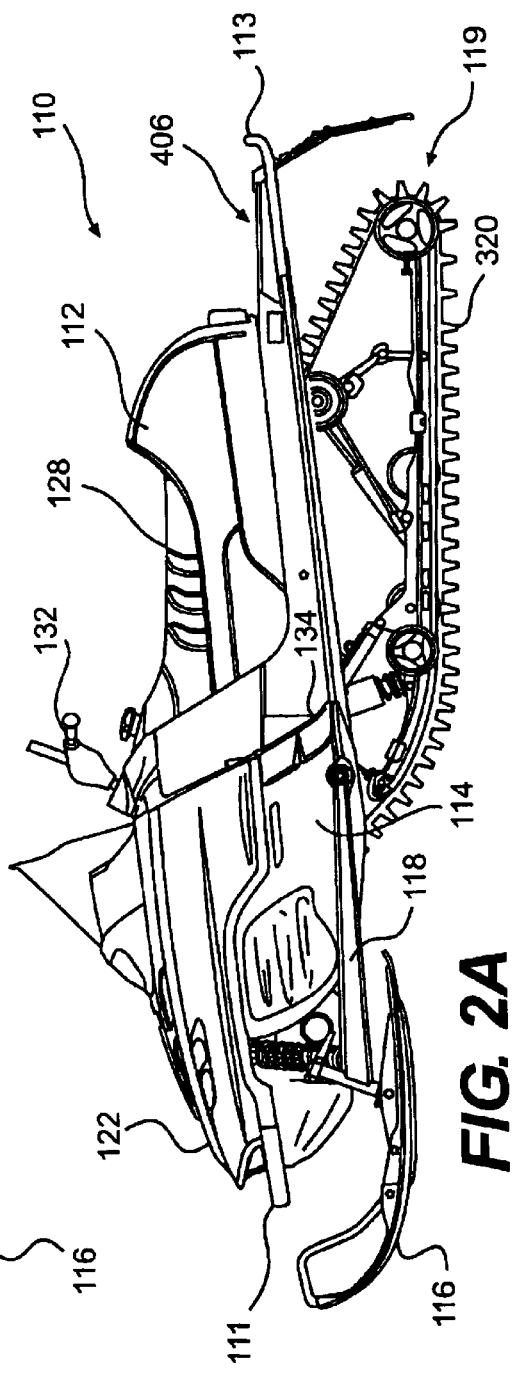
FIG. 2B
FIG. 2A

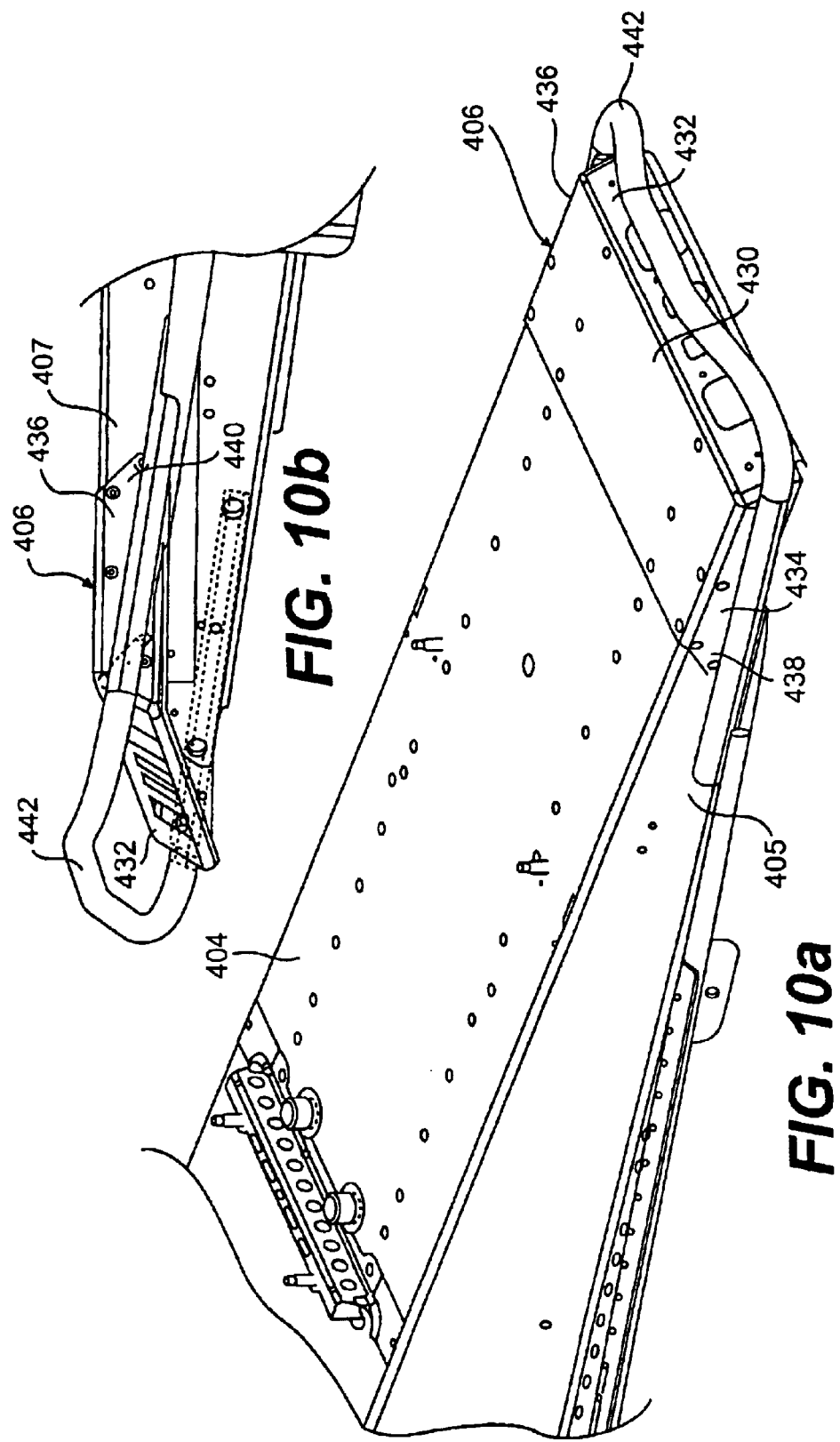

LONG TRACK MOUNTAIN SNOWMOBILE AND A TRACK THEREFOR

This application is a Divisional of U.S. application Ser. No. 09/701,045, filed Nov. 22, 2000, now U.S. Pat. No. 6,510,913. U.S. application Ser. No. 09/701,045 is the national phase of International Application PCT/US00/03401, filed Feb. 11, 2000, which designated the United States. This application also claims priority to U.S. Application 60/181,562, filed Feb. 10, 2000, now abandoned. The entire contents of these applications are herein incorporated by reference.

BACKGROUND OF THE INVENTION

1. Field of the Invention

This invention relates to a snowmobile with a long track designed to provide improved traction and smoother ride in light or powder snow. Further, the present invention concerns a new tread pattern of a snowmobile drive track wherein, among others, the track provides superior flotation and traction while maintaining an acceptable degree of maneuverability compared to the conventional track tread patterns in light or powder snow.

2. Description of Related Art

Given the popularity of snowmobiles nowadays, snowmobile manufacturers are offering increasingly diverse choices of snowmobiles adapted for use in different environments. Examples of various categories of snowmobiles include, inter alia, high-performance snowmobiles, touring snowmobiles, utility snowmobiles, and mountain snowmobiles. The mountain snowmobiles, in particular, are designed to meet the unique demands required by the driving conditions in both the mountains and the trails. Such driving conditions include climbing hills, maneuvering sharp turns around trees, and riding on deep powder snow.

Hill climbing refers to driving a snowmobile up the slopes of the mountains. This task requires that the track of the sled to provide greater traction than as would be provided by the tracks for flatland snowmobiles. More specifically, when climbing hills or sidehilling, the mountain sled is driven in a crisscrossing fashion, substantially upwardly in diagonal directions of the hills, intermittently reversing the lateral direction of the travel. During this operation, the weight of the sled plus the driver is shifted substantially from one lateral side to another, and the sled may be operating substantially leaning on one side. Such sidehilling maneuvers require the snow engaging lugs of both lateral sides of the track to provide substantially more traction than the flatland counterparts. To provide more traction force than the flatland snowmobiles, the mountain snowmobiles typically use longer tracks which have snow engaging lugs with higher heights. Accordingly, where the typical height of the snow engaging lugs for the tracks of flatland snowmobiles is less than about 1 inches, the height of the snow engaging lugs for the mountain snowmobiles is greater than about 1¼ inches, preferably in the range of about 1¾ inches to 2 inches.

Acceptable maneuverability of the snowmobiles during sharp turns is another key ingredient of a mountain snowmobile. Driving the snowmobiles in the mountains frequently requires making turns, particularly in heavily wooded areas, and the mountain snowmobiles should be designed to maintain the steerability of the sleds. While the increased traction force provided by the tracks with higher heights of the snow engaging lugs and the longer nominal length provides improved traction in hill climbing, such tracks tend to propel or "push" the sleds too much, thereby overwhelming the mountain snowmobile's steerability. One skilled in the art describes this excessive "pushing" as the sled being "too wheely" or having too "much rubber."

One way the industry has attempted to deal with the concerns over pushing is by providing narrower ski stance for mountain snowmobiles than flatland snowmobiles, since narrowing ski stance generally tends to enhance the steerability of the sleds. Accordingly, a typical mountain sled is equipped with skis whose ski stance is in a range of about 37 inches to 39 inches, compared to the range of about 40 to 43 inches in the typical flatland snowmobiles.

Finally, flotation refers to the ability of the snowmobiles to stay "afloat" the terrain comprising mainly of fresh powdery snow. In contrast to the flatland trails where there is typically light snow on the ground, in the mountains, there may be hills and terrain which may be covered by as much as 5 to 6 feet of powdery snow. The design of the mountain snowmobiles must provide sufficient flotation on the powder snow as the sled is being driven on such hills and terrain. Typically, the floatability of a snowmobiles is a function of many factors that includes the overall weight of the sleds and the overall surface area of the track contacting the snow surface.

Thus, conventional mountain sleds utilize "regular" tracks having a length of 136 inches to provide more snow contacting surface in comparison to the flatland sleds which generally favor the use of "short" tracks having a length of 121 inches. One notable exception of a flatland snowmobile having a track length greater than the 121 inch short track length is the utility snowmobile which may have a track longer than 136 inches, 156 inches for example. One of the key differences between a mountain snowmobile and a utility snowmobile, of course, lies in the height of the snow engaging lugs, which is substantially greater in tracks for the mountain sleds.

Notwithstanding the foregoing, many in the industry, until recently, used to hold the view that apart from the differences in the ski stance and the track length, the mountain snowmobiles are little different from the flatland snowmobiles. In the last few years, however, snowmobile manufacturers have devoted considerable attention to the mountain snowmobiles to satisfy the special requirements for use in the mountains.

There are several dimensional features of mountain snowmobiles that have been, by in large, constant and unchanging due to the requirements imposed by the specific driving conditions in the mountain applications. One of such dimensions is the aforementioned ski stance which is typically in a range of about 37 inches to 39 inches. Another of such dimensions is the length of the tracks for the mountain snowmobiles, which has been fixed at length of 136 inches. All mountain snowmobile made available by the snowmobile manufacturers heretofore have been made to use tracks having a length of 136 inches and no greater. If the end users wanted more traction or more snow contracting track surface, they needed to purchase an aftermarket track having a length of 141 inches and install using a bracket kit to accommodate the added length of 5 inches in the track.

The industry's adherence to a fixed track length of 136 inches reflects the magnitude of its concerns over "pushing." Although greater traction and better flotation may have been achievable by lengthening the track length, those skilled in the art, however, have been reluctant to increase the length of the tracks for the snowmobiles. Many in the industry have been openly skeptical about whether mountain sleds having a track with a longer length than the industry standard 136 inches would properly function in mountain applications which also require an effective, satisfactory maneuverability. Such skepticism seemingly commanded much support from those skilled in the art, particularly in light of the fact that the snow engaging lugs have a height of about 1¼ to 2 inches. Although these gnarly lugs provide the necessary traction force to climb hills or to keep the sled moving in the deep powder snow, they run the risk of providing too great a traction force. The prevalent view in the industry was that the extra snow engaging lugs in combination with the increased track length would produce too much traction force and that the mountain sled would begin to loose steerability to negotiate around turns, because such "long length" tracks would push the mountain sled too much.

Largely because these concerns over "pushing" and "turning out," one skilled in the art could not and did not change the length of the track, despite potential superior performance of the longer tracks in hill climbing capabilities and flotation. Indeed, such proclivity of the industry is evidenced by the fact that no major commercial manufacturer known to the applicants has made available a mountain snowmobile having a track whose length is grater than 136 inches. Further, even in the aftermarket, no track for mountain snowmobiles has a length greater than 141 inches prior to the present invention.

In efforts to improve upon the currently available mountain snowmobiles, the inventors desired to provide a track whose length is greater than the standard 136 inches and the 141 inches available in the aftermarket. While many in the industry have remained skeptical about using long tracks in mountain snowmobiles, the inventors determined that one of the avenues which could overcome the challenges of using the long tracks in mountain snowmobiles is to improve the tread patterns of the tracks. In particular, the inventors of the present invention focused on the relationship between the tread patterns and the nominal length of the tracks with respect to traction, maneuverability, and flotation.

As would be understood by one skilled in the art, a pitch is a traverse row along reinforcing means provided in the track. A particular arrangements of lugs on a pitch is defined herein as a pitch pattern. An arrangement of pitch patterns over a predetermined number of successive pitches is defined herein as a tread pattern, which repeated identically on the track on successive pitches. The arrangement of the tread patterns over the entire longitudinal length of the track is defined as a track pattern.

Significant research efforts have been devoted to improving and optimizing the characteristics of the tracks for snowmobiles, examples of which include: tread patterns disclosed in U.S. Pat. No. 5,713,645 to Thompson et al., and the tread pattern shown in FIG. 12, manufactured by Camoplast Inc. of Sherbrooke, Canada, Track Number 570-2109 and marketed by Bombardier Inc. of Montreal Canada as the track for a snowmobile under the trademark SKI-DOO, model 2000 Summit 700, model year 1999, shown in FIG. 11. While these noted examples provide effective traction and control of the snowmobile in many applications, the inventors of the present invention have found that still further improvements can be made in optimizing and improving the performance of the tracks, in particular for tracks for use on light or powder snow.

With the existing track profile configurations, when the snowmobile is operating on soft or powder snow, when there is increased traction force, the tracks may tend to simply dig a hole in the snow rather than propelling the sled in the driving direction. That is, given the state of the modern day high powered snowmobiles, under certain circumstances, the tracks with the existing track patterns would provide too much traction force vis-à-vis the steerability of the sleds, i.e., "too much rubber." The most clear example of this shortcoming of the existing track configurations is evident when one attempts to use a long length track in a mountain snowmobile with the conventional track pattern.

As discussed earlier, mountain snowmobiles require the height of the lugs formed on the exterior surface of the track to be at least about 1¼ inches. The current trend is to provide 2-inch or 1¾ inch lugs for tracks for premium quality mountain snowmobiles. At the same time, when the inventors attempted increasing the traction force provided to the snowmobile by lengthening the nominal length of the track from the regular length of 136 inches to 151 inches, the traction force became too large for the snowmobile to maintain its steerability. Thus the requisite maneuverability of the snowmobile necessary in negotiating turns in the mountains was lost.

Thus, the inventors sought a novel track pattern which can advantageously improve the performance of a snowmobile on powder snow. This novel track would also enable the inventors to provide a mountain snowmobile having a long track whose length is greater than 136 inches, which is what the snowmobile manufacturers use, and also greater than 141 inches, which is what aftermarket track manufacturers make available. In that process, the inventors have further found that the novel track pattern surprisingly provides better track performance not only in the mountain snowmobiles, but also other types of snowmobiles, such as flatland snowmobiles.

SUMMARY OF THE INVENTION

Therefore, an object of the present invention is to provide a mountain snowmobile with a track having a length of greater than 141 inches. Another object of the present invention to provide a novel track for a snowmobile with improved track performance characteristics, such as traction, control and flotation.

BRIEF DESCRIPTION OF THE DRAWINGS

FIG. 1A is a side perspective view of a mountain snowmobile in the prior art, manufactured by Bombardier Inc. of Montreal Canada under the trademark SKI-DOO, model Summit 700, model year 1999;

FIG. 1B is a top view of the mountain mobile shown in FIG. 1A;

FIG. 2A is a side perspective view of an embodiment of a snowmobile in accordance with the present invention;

FIG. 2B is a top view of the mountain mobile shown in FIG. 2A;

FIG. 10A is an isometric view of the tunnel with the tunnel extension in accordance with an aspect of the present invention;

FIG. 10B is another isometric view of the tunnel with the tunnel extension illustrated in FIG. 10A viewed from another angle;

DETAILED DESCRIPTION OF EXEMPLARY EMBODIMENTS

Figure 3:
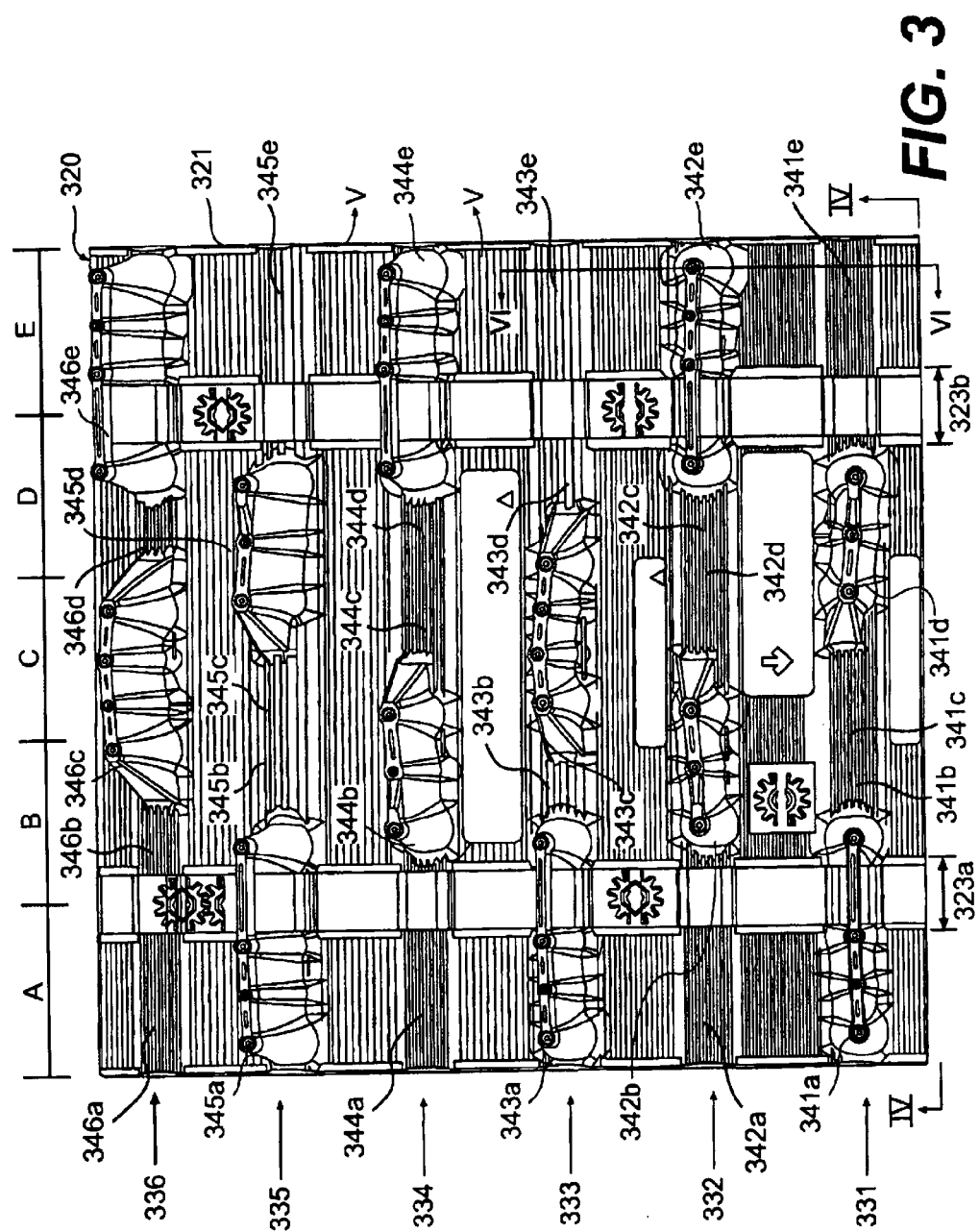
FIG. 3 is a top perspective view of a portion of a snowmobile track illustrating a tread pattern in accordance with the present invention.

Throughout the description of the various embodiments of the present invention, reference will be made to various elements, the construction of which is readily known to those skilled in the art. Accordingly, an exhaustive description of each and every component is not provided, only a description of those elements required for an understanding of the present invention.

FIGS. 1A and 1B illustrate a prior art mountain snowmobile 10 (that sold by Bombardier Inc. of Montreal, Canada, under the trademark SKI-DOO, model Summit 700, model year 1999), which has a forward end 11 and a rearward end 13 (that are defined consistently with the travel direction of the vehicle). The conventional snowmobile 10 includes a body 12 (i.e., the exterior upper portions) and a frame 14. While not shown in FIG. 1, an engine is carried by frame 14 at its forward end. In addition, two skis 16 are attached to the forward end of frame 14 through a front suspension system 18. A drive track 20 is disposed under frame 14 and is connected operatively to the engine for propulsion of the vehicle about a rear suspension system. The length of the drive track 20 for the conventional mountain snowmobile illustrated in FIG. 1 is about 136 inches.

At the front of frame 14, snowmobile 10 includes fairings 22 that enclose the engine to protect it and to provide a external shell that can be decorated so that the snowmobile is aesthetically pleasing. Typically, the fairings 22 comprise a hood and a bottom pad (neither of which have been individually identified in the Figures). A windshield 24 may be connected to fairings 22 near the forward end 11 of snowmobile 10. Windshield 24 acts as a windscreen to lessen the force of the air on a rider when snowmobile 10 is moving.

A seat 28 extends from rearward end 13 of snowmobile 10 to the fairings 22. A steering device 32, such as a handlebar, is positioned forward of a rider and behind the engine. Two footrests 34 are positioned on either side of seat 28 to accommodate the rider's feet.

An embodiment of a snowmobile 110 embodying all aspects of the present invention is illustrated in FIGS. 2A and 2B. It should be noted that the snowmobile of FIGS. 2A and 2B is an embodiment intended to illustrate all aspects of the present invention and is not provided for the purposes of limiting the scope of the present invention to the snowmobiles having exactly all the components of the snowmobile illustrated in FIGS. 2A and 2B. For example, a snowmobile lacking one of the elements of the snowmobile shown in FIGS. 2A and 2B, such as the tunnel extension 406 described more fully below, still can be in accordance with another aspect of the present invention, such as the track pattern described more fully below.

The parts common to the snowmobiles shown in FIGS. 1A, 1B, 2A and 2B, have been designated with same reference numerals with the parts belonging to an embodiment of the snowmobile. The parts of the snowmobile in FIGS. 2A and 2B different than the parts of the snowmobile in FIGS. 1A and 1B are detailed in the following description of the invention, and no other material modifications are contemplated.

Preferably, the snowmobile shown in FIGS. 2A and 2B has a 700 cc engine, and the inventors prefer a cylinder-reed-induction Series 3 Rotax twin engine, traded under the trademark Rotax Engine Type 693 by Bombardier Inc. of Canada. Further, the platform for the snowmobile shown in FIGS. 2A and 2B is preferably a lightweight chassis that provides lower and rearward engine mounting, more preferably a chassis marketed under the trade name of ZX Chassis manufactured by and available from Bombardier Inc. of Canada. The ski stance of the inventors' preferred embodiment is 37 inches.

A. A Mountain Snowmobile With a Long Length Track

In accordance with an aspect of this invention, a preferred embodiment of a mountain snowmobile illustrated in FIGS. 2A and 2B has a track 320 whose length is 151 inches. Previously, available mountain snowmobiles all used a track whose length was no greater than 141 inches, by the virtue of the 136 inch mountain snowmobiles available from the manufacturers and 141 inch track for mountain snowmobiles available in the aftermarket. Thus, the present invention advantageously provides a mountain snowmobile with a track having a length greater than 136 inches as well as greater than 141 inches. Preferably, the mountain snowmobile in accordance with the present invention has a track length of 151 inches. A track length is defined as the circumferential length of the endless body of the track.

A track for a mountain snowmobile is distinguishable from tracks for snowmobiles of other categories in that the height of the profiles is greater than 1¼ inches, preferably between about 1¼ and 2 inches. More preferably, the height of the profiles is between about 1¾ inches and 2 inches.

With the increased track length, there is a greater track surface to contact powder snow and thus, the flotation of the snowmobile is greatly enhanced in comparison with the previously available mountain snowmobiles. Further, with the added track length, the mountain snowmobile in accordance with present invention provides greater traction. At the same time, with a unique and novel track design, the present invention provides an acceptable degree of steerability despite increased track length, contrary to the conventional wisdom of many in the industry.

The preferred embodiment shown in FIG. 2 has a sixty pitch track. In the prior art, the snowmobile tracks have had 54 pitches for the 136" tracks and 56 pitches for the 141" tracks. The 151" track of the preferred embodiment of the present invention accommodates sixty pitches. A sixty pitch track can advantageously accommodate 10 six-pitch tread patterns, 15 four pitch tread patters, 20 three-pitch tread patterns, or 30 dual pitch tread patterns—thus any multiples of the traditional, the dual, or three-pitch tread patterns. In the preferred embodiment, a six-pitch tread pattern is used to optimize the track performance characteristics, as discussed more fully later. Because sixty pitches can accommodate multiples of both dual and three-pitch tread patterns, the 151 inch track of the preferred embodiment offers more flexibility in the track design than the 141 or 144 inch tracks. Further, because the width of the tracks for mountain snowmobiles is typically 15 inches, the 151 inch track can also be expressed as having a nominal length to a nominal width ratio of about 10.067, whereas the conventional 136 inch track has the length to width ratio of about 9.067 and the 141 inch track has the length to width ratio of about 9.400.

Although the preferred embodiment provides a mountain snowmobile having a sixty pitch track or a 151 inch track length, it is emphasized that the present invention is not limited thereto. For example, the invention should be broadly construed to include tracks for mountain snowmobile applications, (i.e. having a lug height of greater than 1¼ inches), having a track length greater than the conventional 136 or 141 inches, specifically including the 144 inch tracks. The 141 inch track is a 56 pitch track with the length to width ratio of about 9.40. The 144 inch track is a 57 pitch track with the length to width ratio of about 9.60. The principles of the present invention in providing a mountain snowmobile with a 151 inch track can be applied to mountain sleds with tracks with lengths grater than 141 inches, including 144 inches.

It should be further noted that 136 inches, 141 inches, 144 inches and 151 inches in describing the track length are not absolute exact measurement, but rather there are negligible deviations in the measurements. For example, the 151 inch track is actually closer to 151.2 inches.

B. Track Profile

Figure 4:
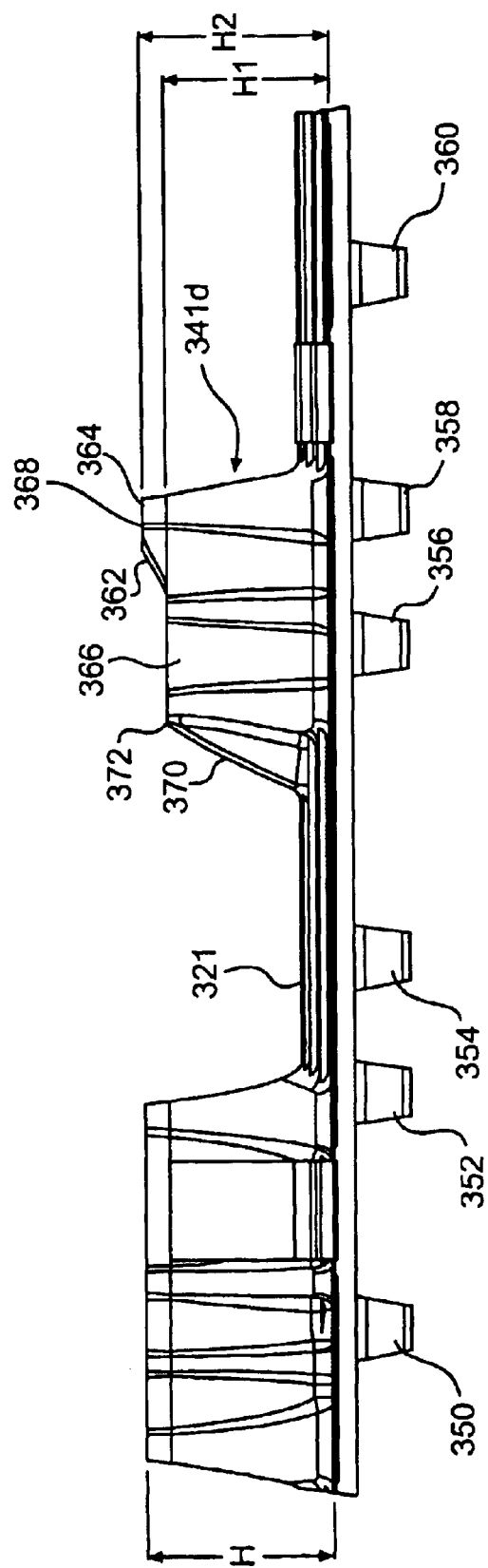
FIG. 4 is a side view of the portion of a snowmobile track illustrated in FIG. 3, taken along line IV—IV, viewed in the longitudinal direction of the track, wherein only the first pitch is illustrated.

In FIG. 3, a portion of the track illustrated in FIG. 2A is illustrated. The track 320 is fabricated as a molding of fabric reinforced natural or synthetic rubber. The track is made from ply rubber in the preferred embodiment. Embedded in the molded rubber body 321 is a plurality of disposed reinforcing rods 328 (see FIG. 5A), each of which extend transversely substantially covering the entire width of the track. As illustrated in FIG. 4, the embedded reinforcing rods 328 are embedded in the body with a regular spacing in longitudinally extending rows. In the preferred embodiment, between two successive longitudinally extending rows is about 2.52 inches. Each horizontally extending reinforcing rod embedded area defines a pitch.

Figure 6:
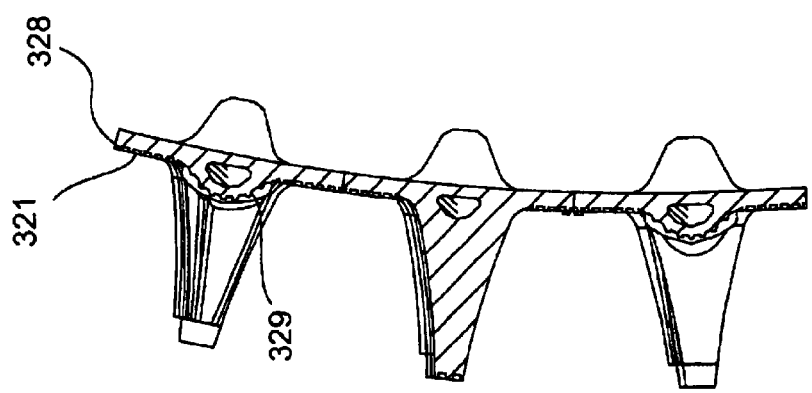
FIG. 6 is a sectioned view of the portion of a snowmobile track illustrated in FIG. 3, taken along line VI—VI, viewed in the transverse direction of the track.
Figure 5A:
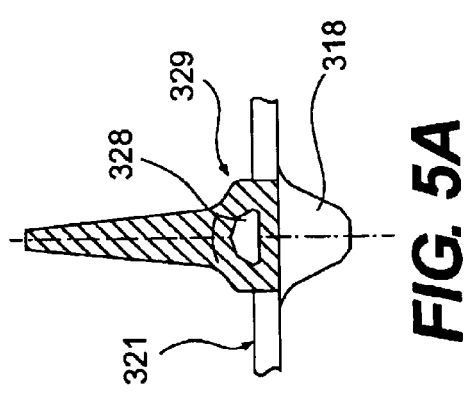
FIG. 5A is a sectional view of one of the projecting profiles of the portion of a snowmobile track illustrated in FIG. 3, taken along line V—V, viewed in the transverse direction of the portion of a track illustrated in FIG. 3.
Figure 5B:
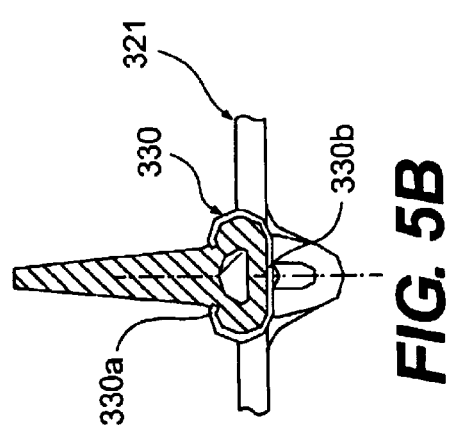
FIG. 5B is a sectional view of an exemplary projecting profile similar to one shown in FIG. 5A except that the profile in FIG. 5B is provided with a metal clip for engagement with the driving means of the snowmobile.
Figure 7:
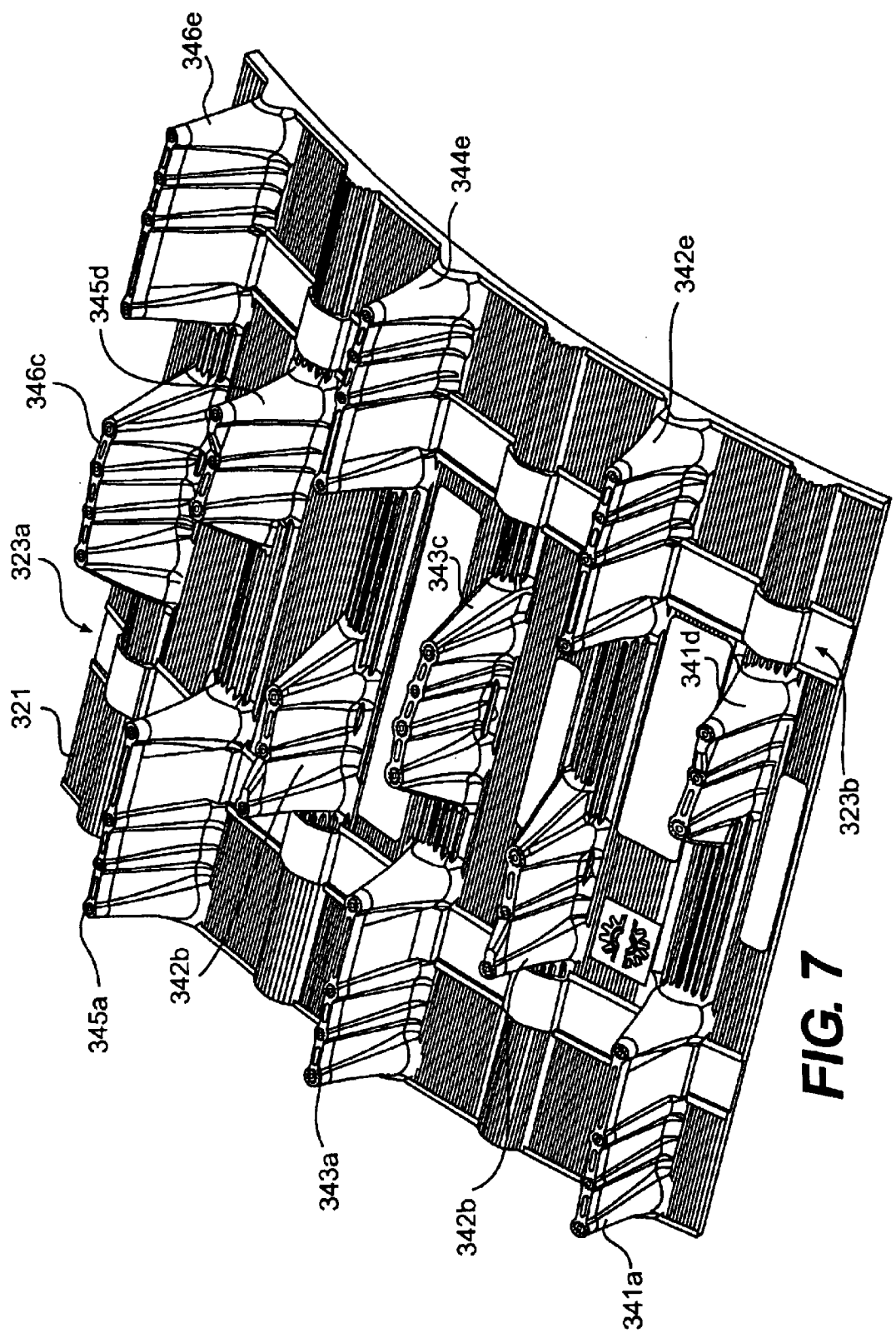
FIG. 7 is an isometric view of the portion of a snowmobile track illustrated in FIG. 3.

FIGS. 5A and 5B illustrate how the reinforcing rod 328 is embedded in relation to the projecting profile 344e and the inner lug 318, the relationship between which is conventional and well known in the art. By virtue of its construction, the rubber body 321 is flexible in its longitudinal direction, and it is stiffened in the transverse direction by the series of regularly spaced reinforcing rods 328 that extend along substantially the entire width of the track, preferably extending along the entire width of the track. The thickness of the track is locally increased in the region of the reinforcing rod embedded area 329 as is evident in FIGS. 5A, 5B and 6. The track body 321 has two longitudinally extending areas corresponding to the sprocket engaging areas 323a, 323b of the track, as shown in FIGS. 3 and 7. On every third pitch, the reinforcing rod receiving areas 329 along the sprocket engaging areas 323a, 323b are preferably reinforced by metal clips 330 of generally C-shaped profile. The ends 330a of the metal clips 330 are clinched into the outer side of the track whereas the central portion 330b lie flat against the interior side of the track body 321 and form bearing means for engagement with the slide rails of the slide suspension, as is well understood in the art.

The outer side of the tracks has a pattern of projecting lugs, integrally formed thereon. The lugs are also referred to as profiles, paddles or ribs, and therefore, these terms will be used interchangeably hereinafter in this application. The profiles are made of fabric reinforced natural or synthetic rubber. The durometer of the compound for the outside cover of the track body 321 may range between about 60° and 80°. The durometer for the compound for the inside cover of the track body 321 and the lugs is about 80 durometer.

The profiles are discussed in further detail with reference to FIG. 3. In general, however, the profiles are provided on the reinforcing rod embedded areas 329 defined on the endless body 321. The presence and absence of the profiles along the transverse direction of a pitch define a pitch pattern for that pitch. The profile pattern formed by a particular arrangement of successive pitch patterns that repeats identically on over the successive pitches defines a tread pattern. The tread pattern is repeated identically on successive pitches on the endless track body. The repeated tread patterns in the successive pitches along the substantial length of the track defines the track profile pattern, also referred to as track pattern herein.

Conventionally, tread patterns based on two pitches or three-pitches have been used in the tracks for snowmobiles. A tread pattern formed based on the repetition of the pitch patterns of two successive pitches is called a dual pitch tread pattern. A tread pattern formed based on the repetition of the pitch patterns of three successive pitches is called a three-pitch tread pattern. For clarification, it is noted that the tread pattern is characterized and defined by the lowest number of the successive pitches comprising the pattern which repeats itself. For example, it can be argued that a set of twelve successive pitches, which is formed by four sets of the three-pitch tread patterns, has a six-pitch tread pattern. Such argument would be contrary to the definition herein. Because the lowest number of successive pitches forming a pattern which repeated itself on successive pitches is three, the proper characterization of the tread pattern in this example is a three-pitch tread pattern, and not a six-pitch tread pattern. The definition of tread pattern provided and illustrated herein shall be applicable to the appended claims also.

The preferred embodiment illustrated in FIG. 3 has a six-pitch tread pattern, i.e., a tread pattern formed based on the repetition of the pitch patterns of six successive pitches. To facilitate the discussion of the preferred embodiment illustrated in FIG. 3, it is helpful to describe the locations of the profiles along the longitudinal and transverse directions of the track 320. Along the longitudinal direction of the track 320, there are illustrated six-pitches: a first pitch 331, a second pitch 332, a third pitch 333, a fourth pitch 334, a fifth pitch 335, and a sixth pitch 336. Along the transverse direction of the track 320, the track 320 is divided roughly into five lateral portions for discussion purposes: a left outer lateral portion A, a left inner lateral portion B, a central portion C, a right inner lateral portion D, and a right outer lateral portion E. Thus, in the six-pitch tread pattern illustrated in FIG. 3 comprises the following profiles:

the first pitch 331 has profiles 341*a* and 341*d*;

the second pitch 332 has profiles 342*b* and 342*e*;

the third pitch 333 has profiles 343*a* and 343*c*;

the fourth pitch 334 has profiles 344*b* and 344*e*;

the fifth pitch 335 has profiles 345*a* and 345*d*; and the six-pitch 336 has profiles 346*c* and 346*e*.

Likewise, the profile-free regions can be designated as follows:

the first pitch 331 has profile-free regions 341*b*, 341*c* and 341*e*;

the second pitch 332 has profile-free regions 342*a*, 342*c* and 342*d*;

the third pitch 333 has profile-free regions 343*b*, 343*d* and 343*e*;

the fourth pitch 334 has profile-free regions 344*a*, 344*c* and 344*d*;

the fifth pitch 335 has profile-free regions 344*b*, 345*c* and 345*e*; and the six-pitch 336 has profile-free regions 346*a*, 346*b* and 346*d*.

It should be understood from FIG. 3 that the numerical designation is for discussion purposes only. Having common designation of the location along the traverse direction of the track does not indicate that they are identical in shape and the precise location. For example, the shapes and the locations of the profile 343*c* and the profile 346*c* along the longitudinal direction are not exactly the same although they are both designated as being disposed in the central portion C. Further, it is worth stressing in the beginning of the discussion of the tread pattern shown in FIG. 3 that the tread pattern shown in the FIGS. 3–7 is meant to be illustrative of the inventive concepts of the present invention, and not to limit the scope of the invention by providing a detailed description of the preferred embodiment of the inventors. For example, the locations, shapes and the number of the profiles on each pitch can be varied easily without departing from the spirit of the present invention.

The following observations are made regarding the tread pattern and the profiles illustrated in FIGS. 3 and 7:

1. There is no "open window," defined and discussed below, extending in the longitudinal direction. In other words, when a tread pattern is viewed in the longitudinal direction, (as is seen in FIG. 4), no profile-free area extends all the way to the next tread pattern. Thus, there is no profile free area along the entire width of the track;

2. The paddles or lugs on the outer lateral portions A and E of the track are provided in a "staggered" relationship in the longitudinal direction, wherein only one paddle is provided every other pitch on each of the outer lateral portions A and E.

3. The thread pattern of the track illustrated in FIG. 3 is a six-pitch pattern, which is the inventors' preferred tread pattern in the preferred sixty-pitch track;

4. The profiles along the width of the track have different heights, such as in the preferred embodiment which shows that the height of the portions of the profiles just inside of the two sprocket engaging areas 323*a* and 323*b* is lower than the height of the portions of the profiles outside of the two sprocket engaging areas 323*a* and 323*b*;

5. Each of the profiles immediately adjacent to and inside the sprocket engaging areas 323*a* and 323*b* have two portions have a different height than the others and are disposed with a slanted step-down area therebetween. For example, as shown in FIG. 4, the profile 341*d* has a higher portion 364 and a lower portion 366 with a slanted step-down area 362. The higher portion 364 has a height of preferably 2 inches, and the lower portion 366 has a height of preferably 1¾ inches. There is provided a tower portion 368 in the higher portion 364 immediately before the step-down area 362. At the lateral ends of some profiles, there are provided slopes extending from the track body surface to the upper edge surface of the profiles. For example, the profile 341*d* has a slope 370 extending from the upper edge surface 372 of the profile 341*d* down to the track body surface 321; and 6. The profiles in the central portion C of the track are provided every third pitch, and are slightly offset from the center.

The above list of observations is not an exhaustive list and therefore should not be viewed as excluding other features of the present invention illustrated in FIGS. 3, 4 and 7.

We discuss the above noted observations with respect to various aspects of the present invention in turn. First, although there are profile-free regions in each pitch, there is no continuous line of profile-free areas in the longitudinal direction of the track. As would be appreciated by one skilled in the art, it is desirable that absent a compelling reason, paddles within a tread pattern leave no profile-free regions along the entire width of the track. If such "open window" in the track exists when viewed in the longitudinal direction of the track, the snow is not cleared from under the track by any of the profiles. The snow left along the track line lifts the aft end of the snowmobile, creating a bobbing action, and ultimately an unstable rough ride of the snowmobile.

Thus, viewed in the longitudinal direction, a plurality of profiles along the pitches of the track should completely cover the transverse width of the track. For example, in FIG. 3, in a view taken from line IV—IV, any portions of the first pitch 331 that are the profile-free regions 341*b* and 341*e* have profile in other pitches further down in the longitudinal direction, the profile 342*b*. 342*e* for example. In the preferred embodiment, an entire width of the track is covered in the transverse direction by the profiles from at most three successive pitches. In the example above, all areas of the profile-free regions 341*b* and 341*e* of the first pitch 331 are compensated with the profiles 342*b* and 342*e* from the second pitch 332. In another example from FIG. 3, all areas of the profile free regions 342*a* and 342*d* of the second pitch 332 are compensated by the profiles 343*a* and 343*c* of the third pitch 333 and the profile 345*d* of the fourth pitch 334.

In another aspect of the present invention, every profile in one pitch in the outer lateral portions A and E is followed by a profile-free region in the very next pitch in the longitudinal direction. Thus, there is one profile every other pitch along the longitudinal direction in the outer lateral portions A and E of the track. This defined herein as a staggered relationship. For example, the profile 341*a* in the first pitch 331 is followed by the profile-free region 342*a* in the second pitch 332, which is in turn followed by the profile 343*a* in the third pitch 333. Likewise, the profile-free region 341*e* in the first pitch 331 is followed by the profile 342*e* in the second pitch 332, which is in turn followed by the profile-free region 343*e* in the third pitch 333. This one profile every other pitch along the outer lateral portions of the track is repeatedly preferably throughout the track.

Figure 11:
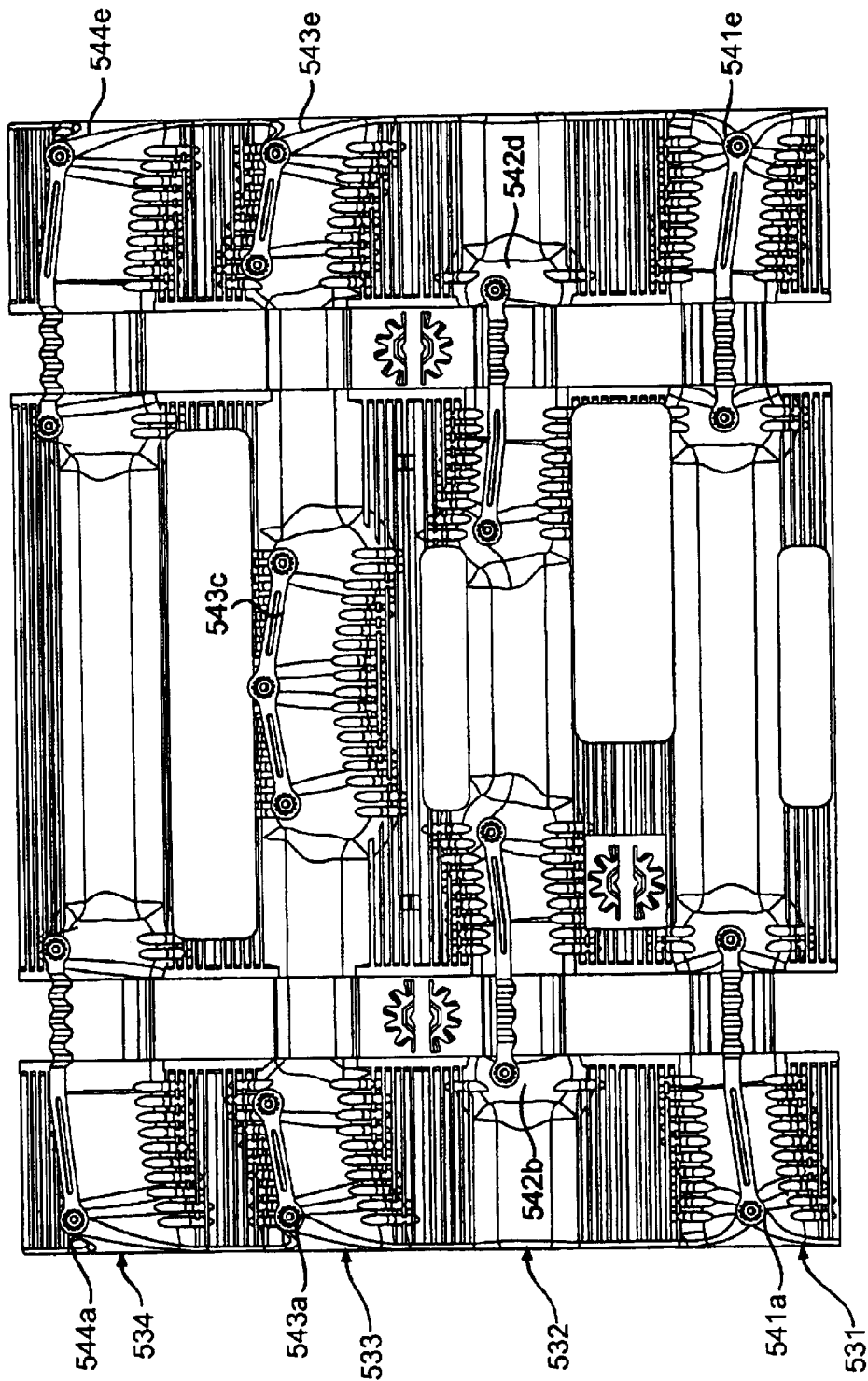
FIG. 11 is a perspective view of a portion of a snowmobile track bearing a tread pattern in the prior art.

The one profile per very other pitch arrangement in the longitudinal direction advantageously provides a better distribution of load per profile, in comparison with a tread pattern which places profiles in successive pitches in the longitudinal direction. For example, in the tread pattern shown in FIG. 11, there are substantially overlapping profiles in the longitudinal direction. For example, about 50% of the profile 541a of the first pitch 531 is overlapped in the longitudinal direction by the profile 542b of the second pitch 532. As another example, 100% of the profiles 543a and 543e in the third pitch 533 of the tread pattern shown in FIG. 11, are in line with, and therefore overlap, the profiles 544a and 544e of the fourth pitch 534.

When two paddles are provided in successive pitches along the longitudinal direction, the second of the paddle becomes "unloaded" because there is less snow for it to grip. In such case, the load on the second paddle located right after the first paddle in the longitudinal direction is substantially less than the first paddle in the tracking direction. Hence, there is a inefficiency associated with the latter paddle placed in a consecutive sequence. Had the second paddle been provided more snow to engage, it would have contributed more to the traction provided by the track.

In contrast, when only one profile is provided in every other pitch in the longitudinal direction, the load on the two paddles, spaced apart by two pitches, tends to be substantially equal, thereby resulting in more balanced loads per paddle. Further, because each paddle is allowed to grip more evenly distributed snow, more traction force can be generated. Thus, by wasting less of the track driving force, the present invention advantageously provides better traction force.

For the mountain snowmobiles, the sled often performs "sidehilling," during which the sled climbs a hill by making a plurality of diagonally upward zigzag moves. During sidehilling, one lateral side of the track contacts more of the snow surface than the other due to the angle of the sled's contact with the sidehill and the consequent weight transfer. Therefore, the profiles on the lateral ends in the transverse direction of the track are relied upon more heavily to provide traction. Obviously, any loss of traction abilities in the lateral portions should be avoided. The tread pattern illustrated in FIG. 3 in accordance with the present invention advantageously allows the profiles placed in the staggered relationship between pitches on the side portions of the tracks to perform better by providing more traction.

Figure 12:
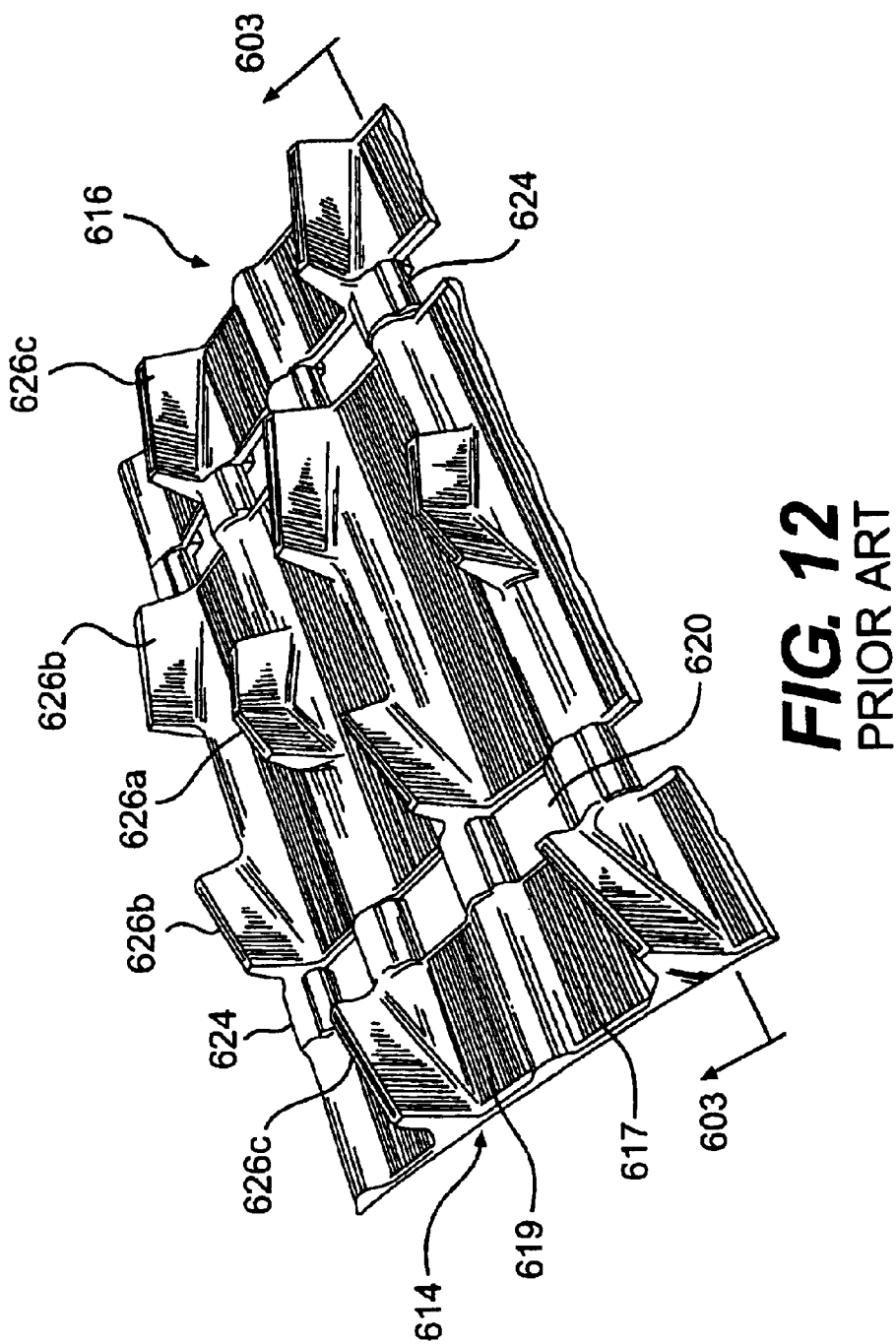
FIG. 12 is a perspective view of a portion of a snowmobile track bearing another tread pattern in the prior art.

In another aspect of the present invention, the tread pattern shown in FIG. 3 is a six-pitch tread pattern. The tread patterns available heretofore were either a three-pitch tread pattern or a dual pitch tread pattern. In the three-pitch tread pattern, three pitches define the tread pattern to be repeated identically on successive threesomes of pitches substantially throughout the length of the track, as shown in FIG. 11. In the dual pitch tread pattern, two pitches define the tread pattern to be repeated identically on successive twosomes of pitches substantially throughout the length of the track, as shown in FIG. 12. In contrast, the tread pattern of the present invention illustrated in FIG. 3 provides a six-pitch pattern, which repeats identically on successive sixsomes of pitches.

The track 320 of the preferred embodiment has sixty pitches and a track length of 151 inches. Although the inventors prefer the number of pitches in the track be a multiple of six, e.g., 60 pitches, the present invention is not limited thereto. For example, because the inventive aspects of the six-pitch track pattern illustrated in FIG. 3 provide what the inventors believe is optimum track performance for the requirements of mountain snowmobiling, one could even use multiples of six-pitches as much as possible and fill in the remaining pitches with any pitch patterns of the tread pattern. For example, if one were to opt for a track for mountain snowmobile having a length of 144 inches and 57 pitches, one can provide nine repetitions of the six-pitch tread patterns and provide the pitch patterns of the first three pitch patterns, e.g. pitch patterns of 331, 332, and 333.

The six-pitch tread pattern in accordance with the present invention is advantageous over the three-pitch pattern because the three-pitch pattern cannot accommodate the one paddle every other pitch in the longitudinal direction arrangement discussed above. If a tread pattern repeats after every three-pitches, there will be at least one pair of paddles per the three successive pitches that is lined up consecutively in the longitudinal direction, given design parameters of snowmobile tracks. The present invention, however, is able to accommodate the one paddle per every other pitch in the longitudinal direction arrangement as shown in FIG. 3.

Dual pitch tread patterns, on the other hand, can accommodate the one paddle per every other pitch in the longitudinal direction arrangement. However, the dual pitch tread patterns have inferior weight distribution than three-pitch tread patterns and the six-pitch tread pattern of the present invention. In short, the percentage of the weight of the profiles in each of the first and the second pitches are roughly 50% in the dual pitch tread pattern. The three-pitch tread pattern, on the other hand, can reduce the weight per profiles in each of the three-pitches to about 33%. Thus, the weight of the sled can be reduced substantially since the lug weight typically comprises about 75% of the total weight of the track. One skilled in the art would appreciate that it is highly desirable to make the snowmobile as light as possible within given design parameters.

This aspect is best explained by analyzing the weight of the paddles in any given three successive pitches. As mentioned earlier, an effective and efficient tread pattern design leaves no profile-free area over the entire transverse width of the track when viewed in the longitudinal direction. In the dual pitch tread pattern, the profiles over two pitches must provide the coverage for the entire transverse width of the track. In contrast, the three-pitch tread pattern has, by definition, three-pitches to provide enough profiles to cover the entire transverse width of the track. The optimum weight of the paddles required to cover the entire width of the track is the same, whether the paddles are in a two pitch tread pattern or in a three-pitch tread pattern, because the entire transverse width of a track can be covered using what would be equivalents to paddles that are all placed in one pitch.

For the purposes of comparison, the weight of the paddles necessary to cover the entire width of the track is assumed as 1.00 kg. It is further assumed that the profiles of the dual pitch pattern and the three-pitch pattern have been optimally arranged. Thus, in the dual pitch pattern, the entire width of the track is covered by the paddles over two pitches, collective weighing 1.00 kg. In the three-pitch pattern, the entire width of the track is covered by the paddles over three-pitches, collective weighing 1.00 kg. Therefore, when the weight of the optimally disposed paddles per pitch is calculated, the weight of the optimally disposed paddles per pitch in the dual pitch tread pattern is 0.50 kg, while the weight of the optimally disposed paddles per pitch in the three-pitch tread pattern is 0.33 kg. Thus, when comparing the weight of the optimally disposed paddles in the dual pitch tread pattern over the same number of pitches with the weight of the optimally disposed paddles per pitch in the three-pitch tread pattern, the weight of the paddles in the dual pitch pattern is 50% greater than that of the three-pitch system. For example, over the three-pitches, the weight of the optimally disposed paddles per pitch in the two-pitch tread pattern is 1.50 kg. In the three-pitch tread pattern, the weight of the optimally disposed paddles per pitch in the three-pitch tread pattern is 1.00 kg. Thus, the weight of the paddles in a track using optimally designed three-pitch pattern is ⅔ of the weight of the paddles in a track using optimally designed two-pitch pattern. One skilled in the art readily agree that the three-pitch tread pattern achieves better weight distribution than two-pitch tread patterns.

Returning to six-pitch track profile of the present invention illustrated in FIG. 3, the tread pattern can be viewed as two three-pitch patterns whose second three-pitch pattern is an inverted image of the first. Thus, the advantages of three-pitch patterns over the two-pitch pattern discussed above are equally applicable to the six-pitch tread pattern illustrated in FIG. 3. Further, the six-pitch pattern sown in FIG. 3 is more preferable to the three-pitch pattern because it allows the one paddle per very other pitch "staggered" relationship on the outer lateral portions of the track. The six-pitch tread pattern of the present invention is also preferable to the dual pitch tread patterns since it can achieve better weight distribution. In fact, quite surprisingly, the weight of the preferred embodiment of the track having a 151 inch length illustrated in FIG. 2A has about the same weight as the weight of the track with three-pitch pattern having a 136 inch length in FIG. 1A.

There are several other reasons for this improved result of the track of the present invention having the reduced weight per same unit of track length in the present invention. First, it is noted that the lugs have been provided in a six-pitch pattern optimizing their placement along the traverse direction. Using the advantages of the three-pitch pattern over the two-pitch pattern, the profile-free regions are compensated over three successive pitches, although on some occasion the compensation is completed in two successive pitches. Second, the staggered relationship of the lugs on the outer lateral portions of the track reduces the incidents of unloaded paddles stemming from lugs provided on successive itches along the longitudinal direction. Thus, each paddle is relied upon for a more balanced load, and the profile pattern of the present invention eliminates the inefficiency associated with the unloaded paddles. Third, some paddles have slopes like the slope 370 of the profile 341d shown FIG. 4. Because less mass is provided than having a block shaped paddle, the total weight of that paddle is reduced. Fourth, as discussed below, the height of the middle section of the track along the transverse direction is reduced and therefore weighs less.

Indeed, the tread pattern shown in FIGS. 3 and 4 has a further novel characteristic in that the height of the profiles of the track is not uniform throughout the track, as more clearly shown in shown in FIG. 4. Generally, in this "hybrid height" arrangement, the height of the profiles at the lateral ends of the track is higher than the height of the profiles at the center of the track, when viewed in the longitudinal direction. Preferably, the height of the profiles remain at the highest from the lateral ends toward where the idler wheels contact the inner side of the track.

In FIG. 4, an elevation view of the profiles 341a and 341d is illustrated. As can been seen in FIG. 4 viewed in conjunction with FIG. 3, the height of the profiles on the outer lateral portions A and E of the track is constant and is higher than the height of the profiles on the central portion of the track. The profiles in the inner lateral sides of the track have both the higher height of the profiles on the outer later portion A and E and the lower height of the profiles on the central portion C of the track. In other words, each of the profiles immediately adjacent to and inside the sprocket engaging areas 323a and 323b have two portions each having a different height than the other with a slanted step-down area 362.

For example, the profile 341a of the outer lateral portion A of the first pitch 331 has a height of H, which remains constant. The profile 343c of the central portion C of the third pitch 334 has a height of $H_2$, which also remains constant. As shown in FIG. 4, the profile 341d of the inner lateral portion D of the first pitch has three portions—a high portion 364 having a height of $H_2$ and a lower portion 366 having a height of $H_1$ with a slanted step-down area 362 connecting the two portions. It is preferable that the step-down areas of the profiles the inner lateral portions B and D be placed on the inside of the areas which contacts the idler wheels on the inner side of the track.

In FIG. 4, there is illustrated a tower portion 368 in the higher portion 364 of the profile 341d, provided immediately before the step-down area 362 of the profile 341d. The tower portions provide reinforcement to the paddles and are located on each of the paddles. At the lateral ends of some profiles, there is provided slopes extending from the track body surface to the upper edge surface of the profiles. For example, the profile 341d has a slope 370 extending from the track body surface 321 to the upper edge surface 372 of the profile 341d.

The overall effect of having $H_1$ on the lateral outer portions and $H_2$ on the central portions is that the hybrid height arrangement advantageously improves various performance characteristics of the track. First, the hybrid height profile arrangement provides improved floatability. Because the height of profiles toward the middle portion of the track is lower, these profiles engage less snow than the profiles on the lateral sides. Hence, when the snowmobile with the track moves, there will be more snow left under the track in the middle portion than the lateral portions. Accordingly, while the snowmobile would tend to assume a position deeper into the snow in the lateral portions, the snow left in the middle portion of the track aids the flotation of the snowmobile-through the powder snow.

Second, the hybrid height profile arrangement assists in addressing the concerns over "pushing" where the snowmobile tends to loose a significant measure of steerability. The concern over pushing is particularly more acute in mountain snowmobiles having an extended long track length, such as greater than 141 inches. When the height of the paddles are reduced from 2 inches to 1¾ inches, the paddles with the reduced height will provide less traction. Thus, the inventors have found that the excessive traction force of the long length tracks can be decreased by reducing the height of the middle portion of the track only. In this way, the hill climbing or sidehilling capabilities provided by the two inch lugs on the outer lateral side of the track is substantially maintained.

On a related note, to further address the concerns over pushing, the profiles on the central portion C of the track have been provided so that they will repeat every third pitch. Inventors have found that it is desirable to have the lugs on the outer lateral portions A and E of the track provide as much traction force as possible to effectively provide the necessary traction when the weight of the sled and the rider is transferred laterally in sidehilling. At the same time, the lugs in the middle portion C can be unloaded and may not necessarily need to generate as powerful traction force as the lugs on the lateral ends of the track.

Therefore, the profiles on the central portion C, as shown in FIGS. 3 and 7, are provided every third pitch. For example, the profiles 343c in the third pitch 333 is followed by the profile 346c in the sixth pitch 336. It can be further observed that the profiles 341a, 342e, 343a, 344e, 345a and 346e in the outer later ends A and E have substantially same lateral width as profiles 343c and 346c in the center portion C, while the profiles 341d, 342b, 344b and 345d provided on inner lateral portions B and D have comparably shorter lateral width. Thus, the profiles on the inner lateral portions B and D also contribute to alleviating concerns over too much pushing.

In the preferred embodiment, the $H_2$ is 2 inches, and $H_1$ is 1¾ inches. These parameters can be easily changed to 1¾ inches for the higher portion and 1½ for the lower portion. Yet even further, the hybrid height arrangement can be advantageously utilized in snowmobile applications other than mountain snowmobiles. For example, the flotation of any snowmobile can be unproved with the hybrid height system. Therefore, the range of heights need not be restricted to between about 1¼ and 2 inches.

The inventors have found that the combination of the six pitch tread pattern and the hybrid height profiles discussed above significantly improves the performance characteristics of a track. An example of such track was tested with a mountain snowmobile having a track with a nominal width of 15 inches and a nominal length of 151 inches. The height of the lugs were about 1¾ inches in the lower portion toward the middle of the track and 2 inches on the outer lateral portions. Previously, when a 151 inch track with conventional tread patterns was tried, the snowmobile was pushed too much, and therefore, resulted in poor steerability. To compensate again the loss of maneuverability, the inventors have experimented with various tread patterns, including the six pitch, hybrid height tread pattern of the present invention. When the tread pattern illustrated in FIG. 2 was utilized, the inventors found that the track provided an acceptable degree of maneuverability even with the long 151 inch track with two inch lugs on the lateral potions of the track and 1¾ inch lugs in the middle was providing increased traction. With the elongated length, the track provided an excellent bill climbing ability. Yet even more, the inventors have found that the lifting aided by the additional surface area of the long track and the hybrid height lugs provides superior flotation of the snowmobile.

C. Tunnel Extension

Figure 8:
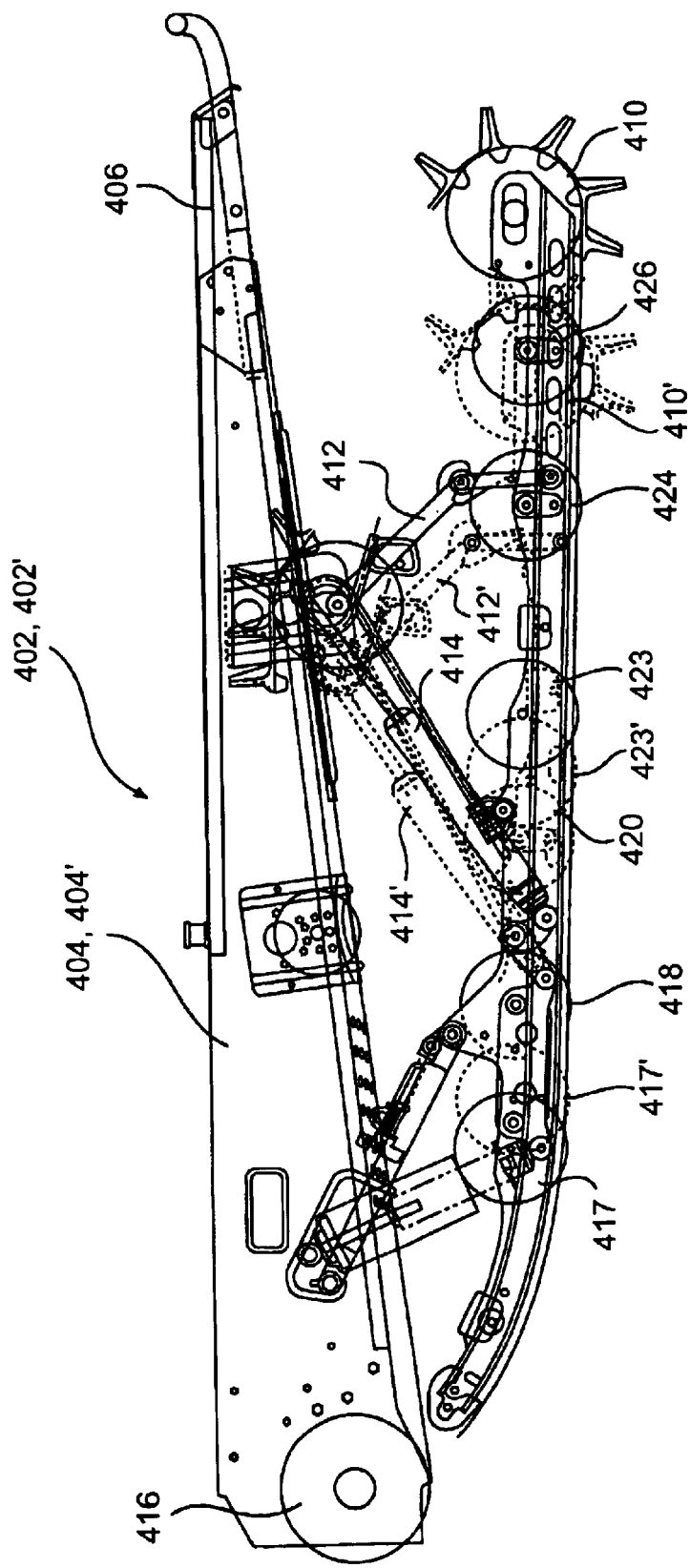
FIG. 8 is a partially sectioned side view comparing a suspension system, frame, tunnel, and tunnel extension of the mountain snowmobile illustrated in FIG. 2A with the a suspension system, frame, and tunnel of the snowmobile illustrated in FIG. 1A.
Figure 9A:
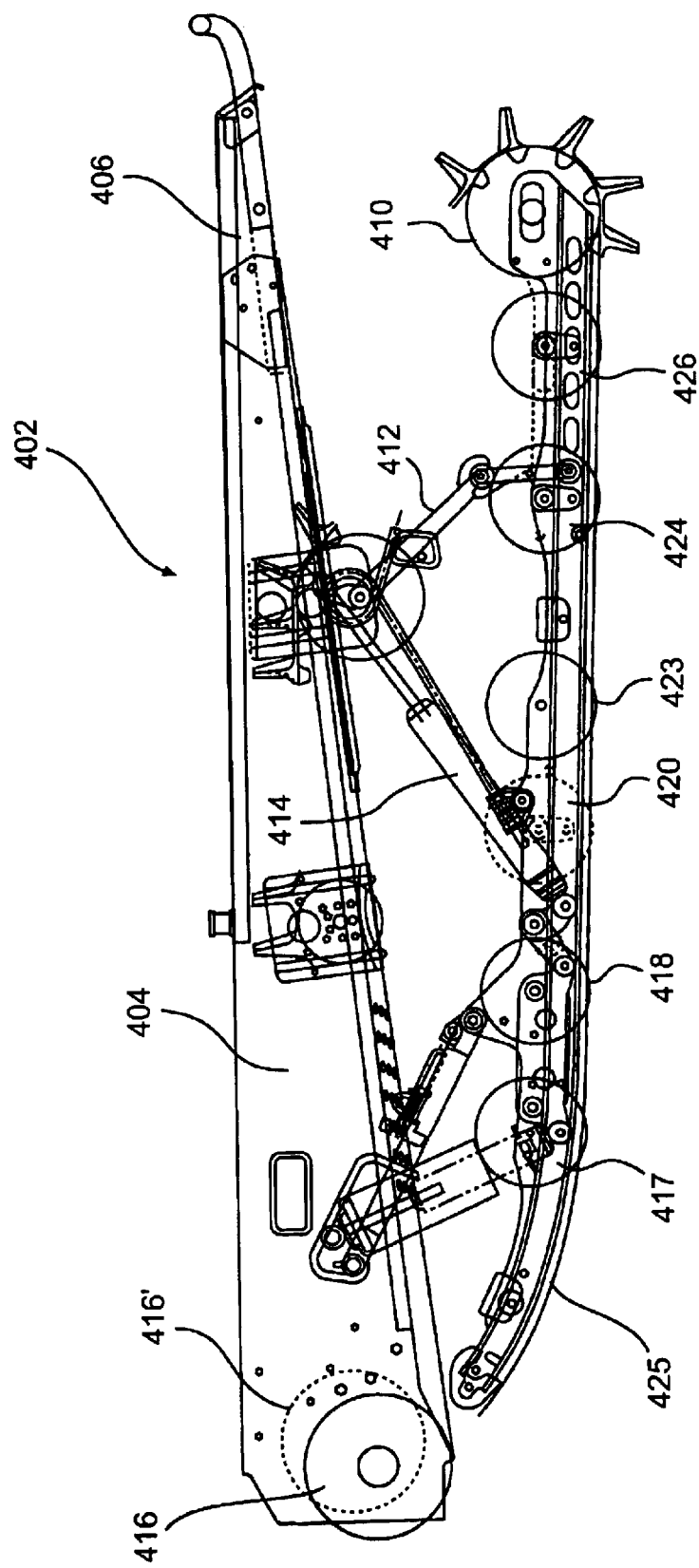
FIG. 9A is a partially sectioned side view comparing a suspension system, frame, tunnel, and tunnel extension of the snowmobile according to the present invention illustrated in FIG. 2A.
Figure 9B:
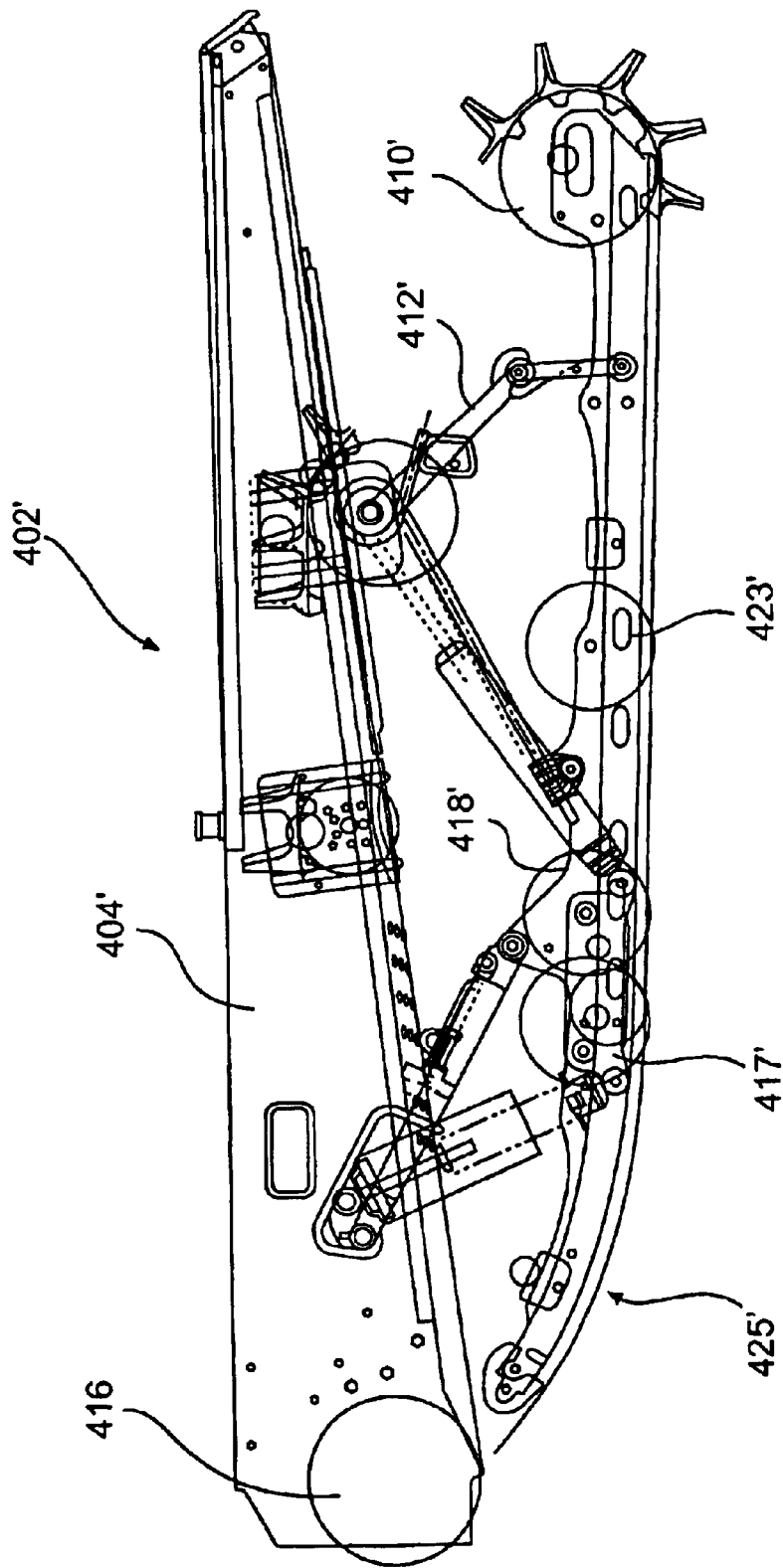
FIG. 9B is a partially sectioned side view comparing a suspension system, frame and tunnel of a snowmobile in the prior art illustrated in FIG. 1A.

Because the snowmobile in the present invention is designed to utilize a track whose length is increased from the conventional regular length track, it is necessary to increase sizes of certain parts of the snowmobile and make several modifications to accommodate the added length in the track. In FIG. 8, the rear suspension systems and the tunnels of the snowmobiles shown in FIGS. 1A and 1B are illustrated to show the modification made to increase the track length to 151 inches. FIG. 9A shows a suspension system 402, a tunnel 404, a tunnel extension 406 and various parts comprising the suspension system, the tunnel, and the tunnel extension of a mountain snowmobile of the present invention. FIG. 9B shows a suspension system 402', a tunnel 404', and various parts comprising the suspension system and the tunnel of a mountain snowmobile of the prior art.

As shown in FIG. 8, the drive wheel 416 has been moved down and rearward slightly, and the rear idler wheel 410 has been relocated further back toward the aft of the snowmobile in comparison to the drive wheel 416' and rear idler wheel 410' of the prior art snowmobile illustrated in FIG. 9B. The locations of other inner idle wheels 417, 418 and 423 have been altered slightly from their prior positions 417', 418' and 423'. Further, the positions of rear shock 414 and rear arm 412 have been also modified slightly in light of the increased length of the track. In addition, the slide frame 425 of the present invention in FIG. 9A is longer in axial length than the slide frame 425' of the snowmobiles with the regular length 136 inch track in FIG. 9B. These above mentioned modifications are viewed as well within the skills of one of ordinary skill in the art. Further, the present invention shown in FIG. 9A contemplates addition of optional inner idle wheels 420, 424, 426, which in themselves are not necessary to practice the present invention.

To accommodate the extra length of the track, the total tunnel length has been extended. Significantly, rather than designing a brand new longer tunnel for the snowmobiles to accommodate the added track length, an aspect of the present invention provides a tunnel extension 406 illustrated in FIGS. 10A and 10B.

The tunnel extension in accordance with this aspect of the present invention is formed of the same material as the tunnel. In the preferred embodiment illustrated in FIGS. 10A and 10B, the tunnel extension 406 is a flank formed aluminum. The tunnel extension is shaped to form a tapered end to give an integral appearance with the tunnel. The tunnel extension comprises a top panel 430, a rear panel 432 and two side panels 434 and 436 as shown in FIG. 10A. As shown in FIG. 10B, the tunnel extension is attached to the tunnel 404 with a plurality of rivets and/or bolts in a manner known to one of skilled in the art. The side panels 434 and 436 have flange portions 438 and 440 that are configured for bolt and rivet connection to the tunnel 404 as shown in FIGS. 10A and 10B. Also as shown in FIGS. 10A and 10B, a substantially U-shaped bumper 442 is connected to both the tunnel 404 and the tunnel extension 406 around side panels 405 and 407 of the tunnel 404, the side panels 434 ad 436 of the tunnel extension 406. The bumper 442 is connected to the side panels 405 and 406 of the tunnel and the side panels 434 and 436 of the tunnel extension 406 by rivets and bolts. The bumper 442 also acts as a handle with which the snowmobile can be pulled when the sled gets tuck in snow.

The added length of the track could have been accommodated by building a new longer tunnel as known in the art. Rather than building another longer tunnel, however, the present invention provides a tunnel extension 406 which could achieve cost savings. In other words, the tunnel extension is advantageous whenever the length of tunnel needs to be extended, but the cost benefit analysis or other considerations indicates that a new design of a longer tunnel is not desirable. The tunnel extension can easily and advantageously provide the extra length in the tunnel.

While the invention has been described with reference to several preferred embodiments, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile, comprising:
   a frame;
   an engine disposed on the frame;
   a drive track disposed below the frame and connected operatively to the engine for propulsion of the snowmobile, the drive track having a plurality of profiles disposed thereon;
   at least one ski disposed on the frame;
   a seat disposed on the frame; and a steering device disposed on the frame forward of the seat, the steering device being operatively connected to the at least one ski for steering the snowmobile, wherein each profile has a height of not less than about 1¼ inches; and wherein the drive track has a length greater than about 141 inches.

2. A snowmobile as claimed in claim 1, wherein the height of each profile is between about 1½ and 2 inches.

3. A snowmobile as claimed in claim 2, wherein the height of each profile is between about 1¾ and 2 inches.

4. A snowmobile as claimed in claim 1, 2 or 3, wherein the length of the track is not less than about 144 inches.

5. A snowmobile as claimed in claim 4, wherein the length of the track is about 151 Inches.

6. A snowmobile as claimed in claim 1, wherein the drive track length is not greater than about 151 inches.

7. A snowmobile as claimed in claim 1, wherein the drive track length is between about 144 inches and about 151 Inches.

8. A snowmobile, comprising:

a frame;

an engine disposed on the frame;

a drive track disposed below the frame and connected operatively to the engine for propulsion of the snowmobile, the drive track having a plurality of profiles disposed thereon;

at least one ski disposed on the frame;

a seat disposed on the frame; and a steering device disposed on the frame forward of the seat, the steering device being operatively connected to the at least one ski for steering the snowmobile, wherein each profile has a height of not less than about 1¼ inches; and wherein the drive track has a ratio of length to width of greater than about 9.4.

9. A snowmobile as claimed in claim 8, wherein the height of each profile is between about 1½ and 2 inches.

10. A snowmobile as claimed in claim 9, wherein the height of each profile is between about 1¾ and 2 inches.

11. A snowmobile as claimed in claim 8, 9 or 10 wherein the ratio of length to width is not less than about 9.6.

12. A snowmobile as claimed in claim 11, wherein the ratio of length to width is about 10.067.

13. A snowmobile as claimed in claim 8, wherein the ratio of length to width is not greater than about 10.067.

14. A snowmobile as claimed in claim 8, wherein the ratio of length to width is between about 9.6 and about 10.067.

15. A snowmobile, comprising:

a frame;

an engine disposed on the frame;

a drive track disposed below the frame and connected operatively to the engine for propulsion of the snowmobile, the drive track having a plurality of profiles disposed thereon;

at least one ski disposed on the frame;

a seat disposed on the frame; and a steering device disposed on the frame forward of the seat, the steering device being operatively connected to the at least one ski for steering the snowmobile, wherein each profile has a height of not less than about 1¼ inches; and wherein the drive track has greater than 56 pitches in its longitudinal direction.

16. A snowmobile as claimed in claim 15, wherein the height of each profile is between about 1½ and 2 inches.

17. A snowmobile as claimed in claim 16, wherein the height of each profile is between about 1¾ and 2 inches.

18. A snowmobile as claimed in claim 15, 16 or 17, wherein the drive track has not less than 57 pitches in its longitudinal direction.

19. A snowmobile as claimed in claim 15, 16 or 17, wherein the drive track has 60 pitches in its longitudinal direction.

20. A mountain snowmobile, comprising:

a frame;

an engine disposed on the frame;

at least one ski disposed on the frame;

a seat disposed on the frame;

a steering device disposed on the frame forward of the seat, the steering device being operatively connected to the at least one ski for steering the snowmobile; and a drive track disposed below the frame and connected operatively to the engine for propulsion of the snowmobile, the drive track comprising an endless body having a ground-engaging outer surface with a central portion flanked by first and second lateral portions, a plurality of longitudinally spaced reinforcing rods disposed in the body along a transverse direction of the body, the rods defining a plurality of pitches, a plurality of profiles projecting from the outer surface of the body along the plurality of pitches, and a plurality of non-profile regions defined along the plurality of pitches, wherein the profiles and profile-free regions define a pattern for each pitch, pitch patterns between successive twosomes of pitches differ, pitch patterns between successive threesomes of pitches differ, and pitch patterns of successive sixsomes of pitches are identical.

21. The mountain snowmobile of claim 20, wherein the profiles define a height profile that varies between the first and second lateral portions.

22. The mountain snowmobile of claim 20, wherein along a longitudinal direction of the body, at least one profile is disposed at every other pitch.

23. The mountain snowmobile of claim 22, wherein the endless body has two lateral sides and the profiles are provided at every other pitch at both of the lateral sides.

24. The mountain snowmobile of claim 20, wherein each profile has a height of not less than 1¼ inches, and wherein the drive track has a length greater than 141 inches.

* * * * *